(12) United States Patent
Grimbach et al.

(10) Patent No.: US 12,122,303 B2
(45) Date of Patent: Oct. 22, 2024

(54) TRAY FOR A VEHICLE

(71) Applicant: Volkswagen Aktiengesellschaft, Wolfsburg (DE)

(72) Inventors: Thomas Grimbach, Hannover (DE); Peter Rehling, Gifhorn (DE); Gerrit Falk, Wolfsburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 776 days.

(21) Appl. No.: 17/055,918

(22) PCT Filed: Apr. 26, 2019

(86) PCT No.: PCT/EP2019/060742
§ 371 (c)(1),
(2) Date: Nov. 16, 2020

(87) PCT Pub. No.: WO2019/219353
PCT Pub. Date: Nov. 21, 2019

(65) Prior Publication Data
US 2021/0206328 A1    Jul. 8, 2021

(30) Foreign Application Priority Data

May 14, 2018 (DE) ..................... 10 2018 207 431.3
Nov. 7, 2018 (DE) ..................... 10 2018 219 007.0

(51) Int. Cl.
*B60R 11/02* (2006.01)
*B60N 3/00* (2006.01)
(Continued)

(52) U.S. Cl.
CPC .......... *B60R 11/0241* (2013.01); *B60N 3/002* (2013.01); *B60R 7/04* (2013.01);
(Continued)

(58) Field of Classification Search
CPC ........ B60R 11/0241; B60R 2011/0007; B60R 7/04; B60N 3/002
See application file for complete search history.

(56) References Cited

U.S. PATENT DOCUMENTS 5,205,447 A * 4/1993 Hambrick ........... B60R 11/0241
224/547
5,524,050 A * 6/1996 Boerema ............. B60R 11/0241
379/454
(Continued)

FOREIGN PATENT DOCUMENTS

CN       1495083 A      5/2004
CN       205498793 U    8/2016
(Continued)

OTHER PUBLICATIONS

Chinese Office Action dated Jan. 24, 2024 in corresponding application 201980032215.2.
(Continued)

*Primary Examiner* — Stanton L Krycinski
(74) *Attorney, Agent, or Firm* — Muncy, Geissler, Olds & Lowe, P.C.

(57) ABSTRACT

A tray for a vehicle for holding at least one mobile device, the tray having: a tray element which forms a holding space for holding the device; a cover element which at least partially covers the holding space; a lid element which is formed on the cover element and at least partially surrounds same so that the lid element forms a tray surface, wherein the lid element is connected to the tray element such that it can be pivoted up and at least partially covers the holding space, and wherein the cover element is designed to stabilise at least the lid element.

18 Claims, 7 Drawing Sheets

(51) Int. Cl.
  *B60R 7/04*  (2006.01)
  *B60R 11/00* (2006.01)

(52) U.S. Cl.
  CPC ............... *B60R 2011/0007* (2013.01); *B60R 2011/0085* (2013.01); *B60R 2011/0094* (2013.01)

(56) References Cited

U.S. PATENT DOCUMENTS

| | | | | |
|---|---|---|---|---|
| 5,752,740 | A * | 5/1998 | Volkmann | B60R 11/0241 297/217.4 |
| 6,536,825 | B2 * | 3/2003 | McAndrew | B60N 2/797 180/326 |
| 6,761,388 | B2 * | 7/2004 | Lein | B60N 3/102 296/37.8 |
| 6,854,778 | B2 * | 2/2005 | Lee | B60N 3/12 296/37.12 |
| 6,866,319 | B2 | 3/2005 | Hupfer | |
| 6,883,852 | B2 * | 4/2005 | Laskey | B60N 3/102 220/350 |
| 6,929,304 | B1 * | 8/2005 | Dry | A47C 7/72 379/454 |
| 8,382,182 | B2 | 2/2013 | Stössel | |
| 8,556,320 | B2 * | 10/2013 | Yamagishi | B60R 7/04 296/37.8 |
| 8,573,665 | B2 * | 11/2013 | Hipshier | B60R 7/04 296/37.8 |
| 8,783,752 | B2 * | 7/2014 | Lambert | H02J 50/005 296/24.34 |
| 9,783,124 | B2 * | 10/2017 | Catlin | H04B 1/3877 |
| 9,878,674 | B2 | 1/2018 | Dunham et al. | |
| 9,981,589 | B2 * | 5/2018 | Senda | B60N 3/107 |
| 10,173,599 | B2 | 1/2019 | Gaw, Jr. et al. | |
| 10,343,574 | B2 * | 7/2019 | Faruque | B60R 7/04 |
| 10,440,633 | B1 * | 10/2019 | Bastiyali | B60R 7/087 |
| 10,919,426 | B1 * | 2/2021 | Campagnone | B60R 7/04 |
| 2003/0155787 | A1 | 8/2003 | Lein et al. | |
| 2004/0118853 | A1 | 6/2004 | Schaal et al. | |
| 2013/0168424 | A1 | 7/2013 | Fan | |
| 2014/0167438 | A1 | 6/2014 | Lambert et al. | |
| 2015/0217667 | A1 | 8/2015 | Senda | |
| 2016/0185300 | A1 * | 6/2016 | Parlow | B60R 13/025 296/37.13 |

FOREIGN PATENT DOCUMENTS

| | | |
|---|---|---|
| DE | 10139867 A1 | 3/2003 |
| DE | 102008047703 A1 | 3/2010 |
| DE | 20 2011 105 255 U1 | 2/2012 |
| DE | 102010056291 A1 | 6/2012 |
| DE | 10 2015 222 685 A1 | 5/2017 |
| DE | 10 2016 006 346 A1 | 11/2017 |
| DE | 102018101121 A1 | 7/2018 |
| EP | 1 284 216 | 2/2003 |
| JP | S6366356 U | 5/1988 |
| JP | S 63-119447 U | 8/1988 |
| JP | H535502 | 5/1993 |

OTHER PUBLICATIONS

Office Action for Chinese Patent Application No. 201980032215.2 mailed on Jul. 11, 2024.

* cited by examiner

TRAY FOR A VEHICLE

This nonprovisional application is a National Stage of International Application No. PCT/EP2019/060742, which was filed on Apr. 26, 2019, and which claims priority to German Patent Application No. 10 2018 207 431.3, which was filed in Germany on May 14, 2018, and which claims priority to German Patent Application No. 10 2018 219 007.0, which was filed in Germany on Nov. 7, 2018, and which are both herein incorporated by reference.

BACKGROUND OF THE INVENTION

Field of the Invention

The present invention relates to a tray for a vehicle that has at least one tray surface. In addition, the invention relates to a method for manufacturing a tray for a vehicle.

Description of the Background Art

It is known from the prior art that trays in the region of a center console of a vehicle are used to stow relatively small objects and/or a mobile device during the trip. Good accessibility and availability of these objects or of the mobile device in these cases oftentimes is only made possible when the objects or the mobile device are openly accessible. However, if the mobile device is a cell phone, then a clear view of it leads to distraction of the driver under some circumstances. If the cell phone is kept from being visible, for example by sliding shutters or covers or the like, then this results in a reduction of availability, however.

Trays of the generic type are known from DE 10 2015 222 685 A1, DE 20 2011 105 255 U1, and DE 10 2016 006 346 A1.

SUMMARY OF THE INVENTION

It is therefore an object of the present invention to provide at least partially overcome the above-described disadvantages. In particular, it is an object of the present invention to increase the accessibility and availability of stowed objects and/or of a mobile device with a tray, and preferably at the same time to allow safer operation of the vehicle and/or to propose a more economical solution for a tray for a mobile device.

The above object is attained by a tray with the features of claim 1, and by a method with the features of claim 16. Additional features and details of the invention are evident from the relevant dependent claims, the description, and the drawings. Of course, features and details that are described in connection with the tray according to the invention also apply in connection with the method according to the invention and vice versa, so mutual reference is or can always be made with regard to the disclosure of the individual aspects of the invention.

The object is attained, in particular, by a tray for a vehicle, preferably for a center console, for receiving at least one mobile device, preferably a cell phone, having:
- a tray element, which forms at least one receiving space for receiving the mobile (which is to say portable) device,
- a cover element, which at least partially covers the receiving space, so that preferably a view of the mobile device in the receiving space can be at least reduced,
- a covering element, which is formed on the cover element, preferably surrounds the same, and preferably at least partially encloses the cover element so that the covering element forms a tray surface (in particular composed of a soft component).

In this design, provision is made, in particular, that the covering element is connected in a movable manner, preferably in a foldable manner, to the tray element, and/or at least partially covers the receiving space, wherein the cover element is especially preferably designed to stabilize at least the covering element and/or the entire tray. This has the advantage that a simple stabilizing means can be used to provide a versatile tray in an economical way. The capability to cover the receiving space by the cover element and/or the covering element additionally has the advantage that a view of the mobile device can be limited, and consequently the risk of distraction for a driver is reduced.

Preferably, the covering element and the cover element can be of one-piece design in this case and/or be permanently and/or rigidly connected to one another. Preferably, the folding open of the covering element and/or (together therewith) of the cover element causes the receiving space to be at least partially uncovered, and consequently an accessibility for the receiving space is increased in the folded-open state of the covering element and/or cover element as compared with the folded-closed state of the covering element and/or cover element. This has the advantage that the mobile device can be removed more easily as a result of the folding open (also: deflection) of the covering element and/or cover element. In the folded-closed state, in contrast, the view of the mobile device is limited, preferably such that the view of a display of the device is prevented.

In preferred fashion, furthermore, the receiving space is spatially delimited by a floor of the receiving element and/or a wall of the receiving element and/or (at least partially, at least in the folded-closed state) by the covering element and/or cover element. The region that is not delimited hereby preferably forms an opening for the receiving space, and preferably is used for depositing and removing the mobile device.

In keeping with another advantage, provision can be made that the cover element is manufactured from a hard component, wherein preferably the tray element and the covering element are each manufactured from a soft component. This has the advantage that objects and/or the mobile device can be accommodated in the tray in a reliable and nonslip manner when they contact the soft component, with adequate stability being provided at the same time by the hard component. In this case, all components of the tray element and/or of the covering element can be manufactured from the soft component.

Furthermore, provision can be made in the tray according to the invention that the cover element is manufactured from a first material, in particular a hard component, and the tray element and/or the covering element is/are manufactured from a second material, in particular a soft component, wherein the first material differs from the second material. By preference, the second material can have a greater elasticity than the first material, and therefore preferably be rubberlike in design. In other words, the tray element and/or the covering element can also be construed as a rubber mat. Moreover, the first material or the hard component can have a greater hardness than the second material or the soft component. Preferably, the first and/or second material is/are each implemented as a plastic. By preference, the hardness of the first and/or second material can be understood to be a Shore hardness. For example, the first material and/or the cover element are designed to be rigid and/or nonelastic in order to provide adequate stability for the tray. The hard component can feature a thermoplastic plastic and/or a thermoplastic terpolymer and/or an acrylonitrile-butadiene-styrene copolymer (ABS), for example. The soft component, in particular the soft component of the tray molded onto the hard component, can feature a thermoplastic elastomer (TPE), for example.

The tray element and/or the covering element and/or the tray surface of the covering element and/or the floor of the tray element and/or the soft component, as a tray for the device and/or other objects, can additionally be designed to cushion and/or to secure and/or to damp and/or to improve the sliding behavior. In particular, the elastic properties of the soft component are used for this purpose. The soft component can accordingly have a higher elasticity than the hard component. In contrast, the cover element and/or the hard component can be used for stabilization, preferably as the sole nonelastic and/or rigid element of the tray.

Furthermore, provision is optionally made in the tray according to the invention that the tray is implemented as a two-component injection molded part, preferably as a single piece and/or as one part and/or monolithically. This allows a compact construction and especially economical manufacture.

It can be advantageous within the scope of the invention when a living hinge is provided that connects the covering element and/or the cover element to the tray element in a foldable manner. The living hinge advantageously is arranged in a rear region—which is to say on a back—of the tray, wherein the rear region is, if applicable, the region that is oriented toward the vehicle floor and/or facing away from the vehicle interior and/or from the driver when the tray is in the inserted state in the center console. This allows the driver to conveniently and easily fold open the covering element in order to remove the mobile device. It is preferred here for an opening of the receiving space to be formed on a front (i.e., a side facing the driver or the vehicle interior) of the tray, and to be delimited by a front edge of the covering element and a front edge of the tray element spaced apart therefrom. It is especially preferred for the opening to be designed such that the mobile device can be inserted into the receiving space when the covering element is in the folded-closed state (in the case of a relatively small opening) without the need to fold the covering element open to do so. The opening is enlarged when the covering element is folded open, for example. In order to reliably permit folding open, the living hinge can be molded onto the covering element and/or onto the tray element, preferably at the back of the tray.

Additionally, the invention can provide, in a tray, that the living hinge is formed between a wall element and the tray surface of the covering element. Depending on the arrangement of the tray in a center console or between an instrument panel and the center console, the wall element can be the rear wall element or the side wall element. Preferably, the wall element in the vicinity of which the living hinge is formed is the wall element in a rear region of the tray, which element faces away from the vehicle interior and/or from the driver when the tray is in the inserted state. The material thickness of the covering element is reduced in the region of the transition from the wall element to the tray surface and is advantageously suitable to form the living hinge.

In addition, the invention can provide, in a tray, that the living hinge has at least one return element in order to assist the covering element during transfer from a folded-open state to a folded-closed state. In operation of the tray, when the covering element is repeatedly folded open and folded closed, it can occur that the covering element does not independently drop back completely into the intended folded-closed state. This can happen, for example, when at least one of the elastic elements of the tray is stressed too highly and/or is stretched. There is a risk in this case that the automatic closure of the foldable tray no longer exists fully after repeated operation. In the worst case, the tray becomes damaged and must be replaced. The return element can ensure in an advantageous manner that the covering element reliably attains its intended, folded-closed state. As a result, the service life of the tray can be lengthened considerably.

Moreover the invention can provide, in a tray, that the at least one return element is designed to be resilient and/or elastic. Consequently, the covering element advantageously can be brought from the folded-open state into the folded-closed state by spring loading. Consequently, the covering element can spring back into the folded-closed state.

It is possible within the scope of the invention that the at least one return element is made of a soft component. The soft component can preferably be the same as that of the covering element. In this way, the manufacture of the return element can be simplified, and preferably can be accomplished together with the construction of the covering element. Nevertheless, it is also possible, however, that the return element can be attached to the covering element later, for example through an integral joint, such as, e.g., adhesive bonding or welding. In this case, the return element can be made of the same material as the covering element or a different material.

Also, the invention can provide, in a tray, that the at least one return element is designed in the form of an S-shaped strip or a C-shaped strip. Consequently, a spring function within the framework of the return element can be realized solely through the shape of the return element. When the covering element is folded open, the return element can be compressed in the loops of the S-shaped strip or in the curve of the C-shaped strip. When the covering element is released, the return element relaxes and the covering element springs back into the intended folded-closed state. In addition, it is possible that at least one return element can be designed in the form of a damping element or of a cam on which the covering element can be cushioned simply.

Furthermore, the invention can provide, in a tray, that the at least one return element is formed between a rear wall element and a side wall element of the covering element. The living hinge is located at this point, and the covering element has a taper there. A relatively short travel distance of the return element can be realized here, so that the return element can transfer the covering element into the intended, folded-closed state in a stable manner.

It is also possible within the scope of the invention that the covering element has at least one wall element that projects (preferably orthogonally) at one edge of the tray surface and thus delimits the tray surface, preferably so that the covering element forms a dish for receiving objects. In this way, the at least one wall element protects objects held in the dish from falling out. In addition, this can be assisted by the means that the tray surface on which the objects rest is designed to be nonslip and/or made of a soft component and/or elastic. Furthermore, it can be possible that the tray surface (in particular the entire tray surface) overlaps the cover element (preferably completely). It is ensured by this means that the accommodated items contact the tray surface alone, and not the cover element, but the items can nevertheless rest on the cover element in a stable way.

Preferably, the tray element has at least one wall that projects from an edge of a floor of the tray element so that the tray element forms a dish that provides the receiving space for receiving the mobile device.

It can furthermore be possible that the covering element completely encloses the cover element with the exception of at least one lateral face of the cover element, preferably surrounds the cover element, wherein preferably the lateral face extends in a plane parallel to an external surface of a wall element of the covering element and/or orthogonally to the tray surface. In this way, the sole region of the cover element that is excluded from being covered by the covering element can be one that does not come into contact with objects stowed in the tray. This makes it possible to save on material that is not necessary for secure stowage.

Moreover, the invention can provide, in a tray, that the cover element has, on a lateral face, at least one latching element that can be brought into a releasable interlocking and/or frictional connection with at least one mating latching element of the tray element in order to secure the covering element in a folded-closed state. Consequently, the result can be achieved with simple means and economically that the covering element is secured in the folded-closed state. The folded-closed state is indicated by the snapping of the latching element into the mating latching element so that errors in aligning the covering element are avoided. In addition, the snapping of the latching element into the mating latching element can provide haptic feedback to the user that the folded-closed state has been attained securely.

It is also optionally possible that the tray is designed as a cell phone tray, and the cover element is designed to completely or partially cover a display of the device in the form of a cell phone. In this way, distraction while driving can be reduced.

In addition, it is advantageous when the tray is designed to be inserted in a receptacle of a center console of the vehicle, wherein, in particular, a narrow side of the device can be received in the receiving space of the tray element. Additionally, it is possible that the tray is designed to be inserted in a receptacle between an instrument panel and a center console of the vehicle, wherein, in particular, a wide side of the device can be received in the receiving space of the tray element. Flexible use of the tray in the vehicle can be achieved as a result.

And preferably a floor of the tray element is designed to pass an electromagnetic signal of an adjacent coupling antenna of the vehicle on to the device. The coupling antenna is located, for example, on the center console directly adjacent to the floor of the tray element, and preferably serves to amplify a cellular signal of the device and/or to perform wireless charging, which is to say wireless charging of a battery of the device.

The device can be implemented, for example, as a cellular device for cellular communication and/or as a smartphone and/or as a tablet and/or as an electronic terminal and/or as entertainment electronics and/or as a small device. The device in this case can preferably have a cellular interface and/or a display and/or a battery.

It is advantageous, in addition, when the vehicle is implemented as a motor vehicle, in particular a trackless land vehicle, for example as a hybrid vehicle, that includes an internal combustion engine and an electric machine for traction, or is implemented as an electric vehicle, preferably with a high-voltage vehicle electrical system and/or an electric motor. In particular, the vehicle can be implemented as a fuel cell vehicle and/or passenger car. Preferably, in the case of embodiments of electric vehicles, no combustion engine is provided in the vehicle; it is then driven exclusively by electrical energy. Preferably, the vehicle has a center console between the driver's seat and the front-passenger seat in the vehicle interior, in which the tray according to the invention can be inserted.

The subject of the invention is likewise a method for manufacturing a tray, in particular a tray according to the invention, for a vehicle, for receiving at least one mobile device. Provision is made here that the following steps are carried out, preferably in any arbitrary sequence or in the sequence listed:

manufacturing a tray element from a soft component,
manufacturing a cover element from a hard component,
surrounding the cover element with a soft component to form a covering element,
connecting the covering element, which encloses the cover element, to the tray element, preferably by means of a molded-on living hinge.

As a result, the method according to the invention provides the same advantages as have been described in detail with reference to a tray according to the invention.

It can also be possible that at least one of the steps, preferably the manufacturing of the tray element and/or the manufacturing of the cover element and/or the surrounding and/or the connecting, is carried out in a two-component injection molding process. In particular, the steps of a method according to the invention can be carried out in a single tool in the case of two-component injection molding, alternatively at least two tools can be used for these steps or for manufacturing the tray when the two-component injection molding process is not used.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

In the following figures, identical reference symbols are used for the same technical features, even for different exemplary embodiments.

Figure 1:
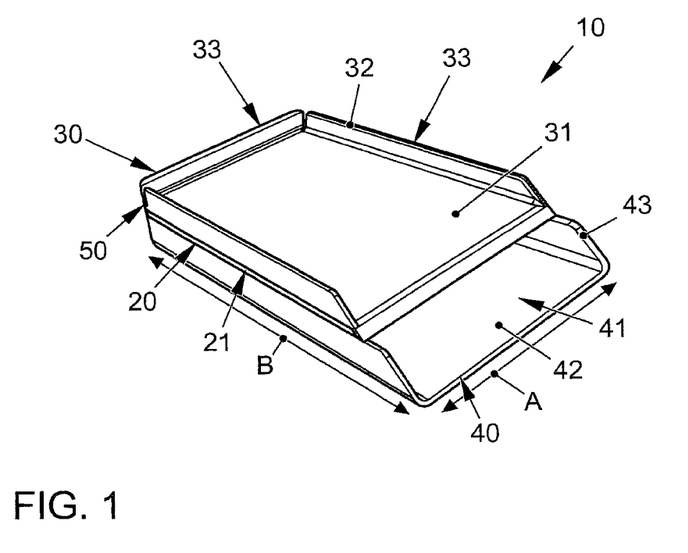
FIG. 1 a schematic representation of a tray according to the invention.

In FIG. 1, a tray 10 according to the invention is shown schematically. In this case, the tray 10 according to the invention can be suitable for use in a center console 3 of a vehicle 2 in order to accommodate at least one mobile device 1. The mobile device 1 is implemented, for example, as a cell phone or a smartphone or the like.

Also shown in FIG. 1 is that the tray 10 according to the invention can have a cover element 20, which is manufactured from a hard component, for example. Furthermore, a covering element 30 and a tray element 40 can be provided, which are each manufactured from a soft component. The covering element 30 can form an upper dish of the tray 10 according to the invention for accommodating small objects. The tray element 40 can form a lower dish of the tray 10 according to the invention for accommodating the mobile device 1. The directional indications refer here to the vehicle directions in the state in which the tray 10 according to the invention is inserted in the vehicle or in the center console.

The tray element 40 can form a receiving space 41 for receiving the device 1. The cover element 20 can at least partially cover the receiving space 41 in this case, for example in order to prevent a view of a display 6 of the mobile device 1. The covering element 30 can be formed on the cover element 20 and at least partially enclose it so that the covering element 30 forms a tray surface 31. Consequently, this tray surface 31 can offer a nonslip tray for small objects. It can be seen in FIG. 1 that the covering element 30 completely encloses the cover element 20, or completely surrounds the cover element 20, with the sole exception of at least one lateral face 21 of the cover element 20. It can likewise be seen that the lateral face 21 extends in a plane parallel to an external surface of a wall element 32 of the covering element 30 and orthogonally to the tray surface 31. Consequently, the only region of the cover element 20 that is not covered by the covering element 30 is one that cannot come into contact with objects stowed in the tray 10 according to the invention.

The tray surface 31 is delimited by at least one wall element 32, which projects from an edge 33 of the tray surface 31 and thus delimits the same. The tray element 40, which forms a floor 42, at the edge of which projects a wall 43, has a similar construction in the manner of a dish. In this way, the receiving space 41 can be constructed such that an object located therein, or the mobile device 1, cannot fall out.

Furthermore, a living hinge 50 can be formed on the back of the tray 10 according to the invention—facing away in FIG. 1—in order to connect the cover element 20 or the covering element 30 to the tray element 40 in a foldable manner. This makes it possible to transfer the tray 10 according to the invention from a folded-closed state (shown in FIG. 3) to a folded-open state (shown in FIG. 4).

Figure 2:
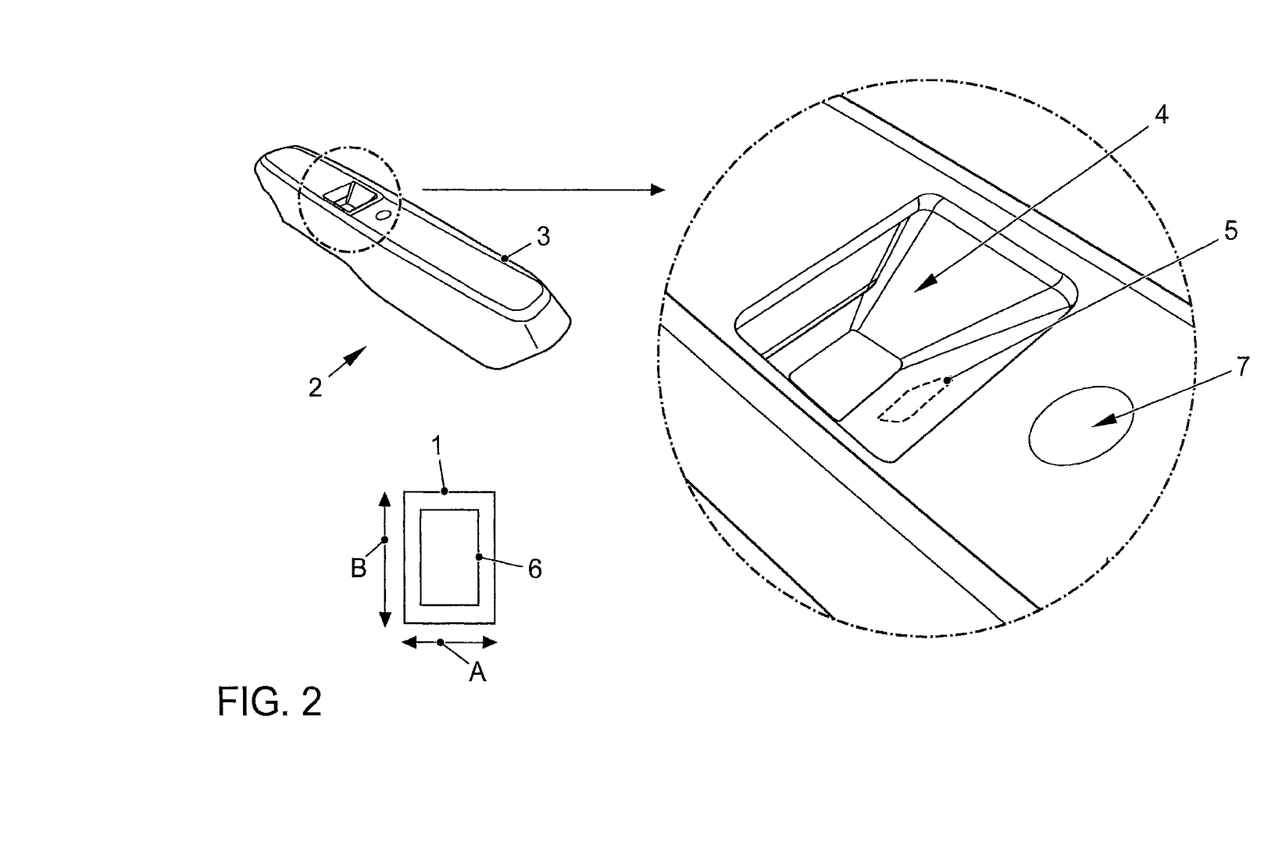
FIG. 2 a schematic representation of a center console of a vehicle.

In FIG. 2, a center console 3 of a vehicle 2 is shown schematically; said center console has a receptacle 4 for a tray 10 according to the invention. A coupling antenna 5, which serves the purpose of a signal connection to a mobile device 1, can be integrated into the receptacle 4. Furthermore, various interfaces 7, for example USB interfaces, can be provided on the center console 3 for data connection to the mobile device 1. A wide side B and a narrow side A of the device 1 are indicated with double-headed arrows in FIG. 2. In the exemplary embodiment from FIG. 2, the receptacle 4 is formed in the center console 3. In this case, a narrow side A of the mobile device 1 is inserted into the receiving space 41 of the tray element 40. In addition to the receptacle 4 shown in FIG. 2 for the tray 10 according to the invention, other receptacles 4 in the vehicle 2 are also possible within the scope of the invention. Another possible receptacle 4 for the tray 10 according to the invention in the vehicle 2 is discussed below with the aid of FIGS. 8 and 9.

Figure 3:
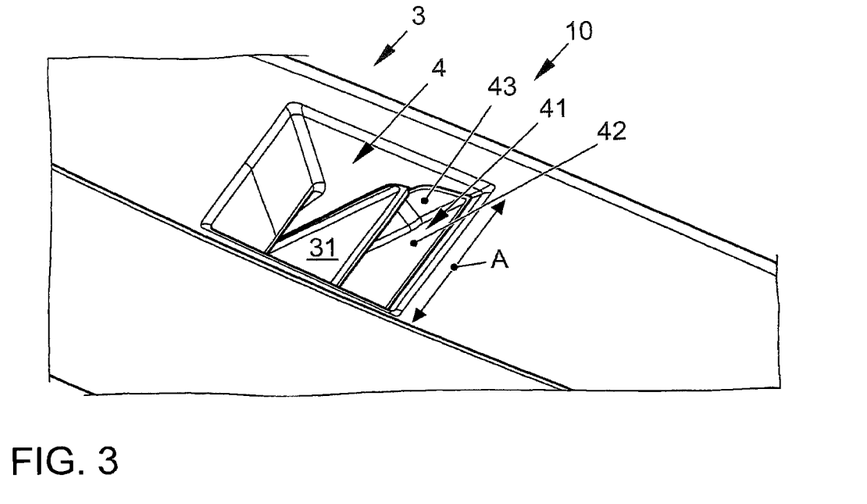
FIG. 3 a schematic representation of a tray according to the invention in a folded-closed state, wherein the tray is inserted in a center console of a vehicle, FIG. 4 a schematic representation of a tray according to the invention in a folded-open state, wherein the tray is inserted in a center console of a vehicle, FIG. 5 a schematic representation of a receptacle of a center console for the tray according to the invention, FIG. 6 a schematic representation of a receptacle of a center console with an inserted tray according to the invention, FIG. 7 a schematic representation of a tray according to the invention in a folded-open state, FIG. 8 a schematic representation of a receptacle between an instrument panel and a center console for the tray according to the invention with a covering element that is folded closed, FIG. 9 a schematic representation of a receptacle between an instrument panel and a center console for the tray according to the invention with a covering element that is folded open, FIG. 10 a schematic representation of a hinge element for folding open a covering element, FIG. 11 a schematic representation of a hinge element with at least one return element for a covering element, in a top view, FIG. 12 a schematic representation of a hinge element with at least one return element for a covering element, in a side view, FIG. 13 a schematic representation of a latching element for securing a covering element, and FIG. 14 a schematic representation of a latching element for securing a covering element, in a sectional representation.
Figure 4:
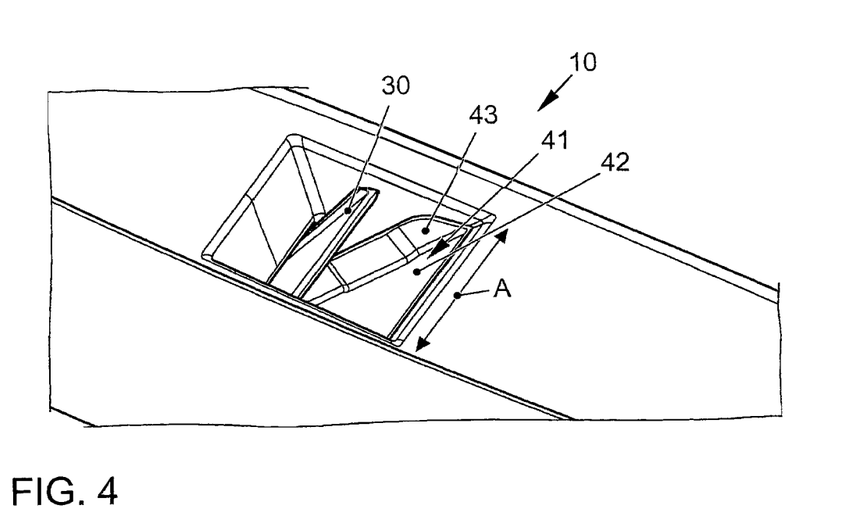

In FIGS. 3 and 4, the tray 10 according to the invention is shown in an inserted state in the center console 3. It can be seen that a mobile device 1 can be slid into the receiving space 41 in a simple manner, in particular by the narrow side A, even in the folded-closed state shown in FIG. 3. To remove the mobile device 1, the tray 10 according to the invention can also be folded open as shown in FIG. 4. The cover element 20 provides adequate stability that is necessary for this purpose.

Figure 5:
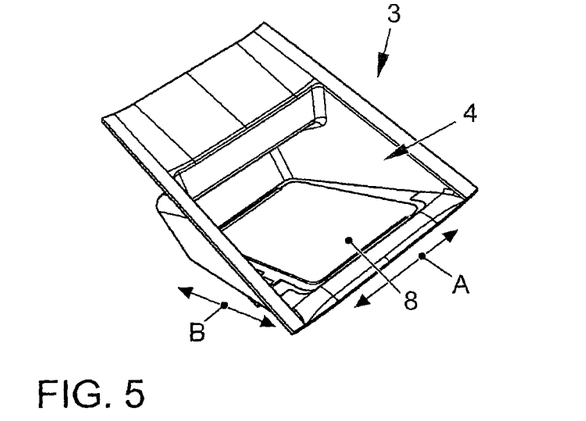

In FIG. 5, a receptacle 4 of a center console 3 is shown with further details. It can be seen that a structural adaptation 8 of the receptacle 4 can be provided for a coupling antenna 5 in order to enable a connection between the device 1 and the coupling antenna 5. A corresponding adaptation can be provided on the floor 42 of the tray element 40 if applicable.

Figure 6:
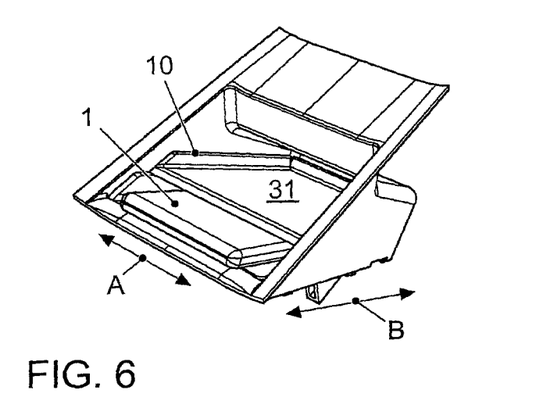

FIG. 6 shows an exemplary embodiment of the tray 10 according to the invention in which a mobile device 1 is in place in the receiving space 41. In this case, it can be possible that the mobile device 1 can also be pushed far enough into the receiving space 41 that a top of the mobile device 1 is completely covered by the tray surface 31 and/or the cover element 20.

Figure 7:
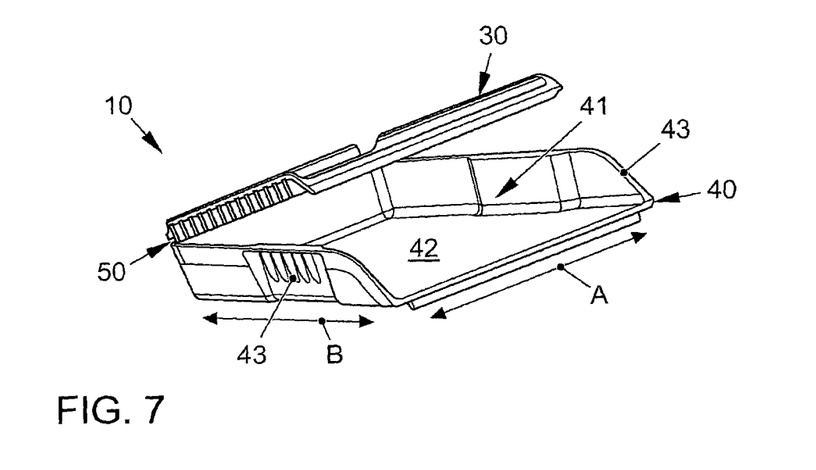

FIG. 7 shows a tray 10 according to the invention in which the covering element 30 is in the folded-open state. Folding open is made possible by, for example, a living hinge 50 on the back of the tray 10 according to the invention, which hinge extends, if applicable, partially along an edge 33 of the tray surface 31. It can also be seen in FIG. 7 that the cover element 20 is surrounded by a soft component in accordance with a method according to the invention in order to create the cover element 20.

Figure 8:
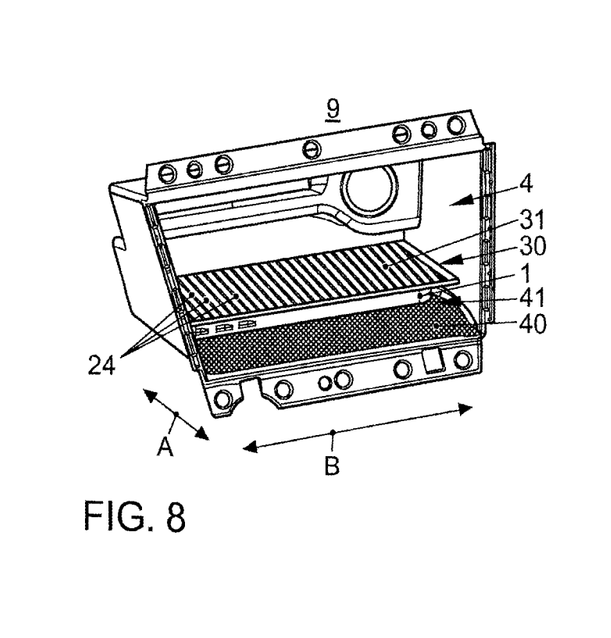
Figure 9:
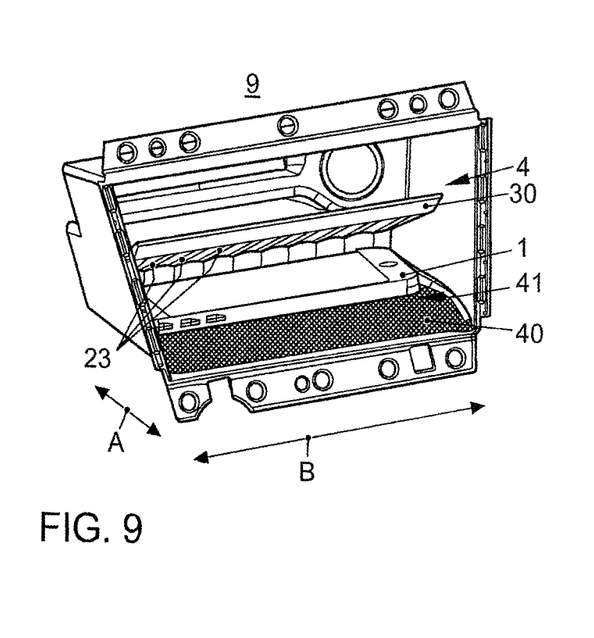

FIGS. 8 and 9 show another possible receptacle 4 for the tray 10 according to the invention in an interior of the vehicle 2. This receptacle 4 can be located between an instrument panel 9 and a center console 3 of the vehicle 2, for example. In this case, it is possible that a wide side B of the device 1 can be accommodated in the receiving space 41 of the tray element 40. The tray 10 can be designed essentially identically to the tray 10 from FIG. 1 or 2, with the exception that the receiving space 41 is open from a wide side B of the device. Additional features of the tray 10, as for example a living hinge 50 for folding open the covering element 30, a return element 52, 53 for springback of the covering element 30, etc., can also be present in the tray 10 shown in FIGS. 8 and 9.

FIGS. 8 and 9 show that the covering element 30 can have soft, elastic grooves 23 on the underside so as not to damage the mobile device 1. On the upper side, for example on the tray surface 31, the covering element 30 can have a texturing 24 so that the small objects do not slip.

Figure 10:
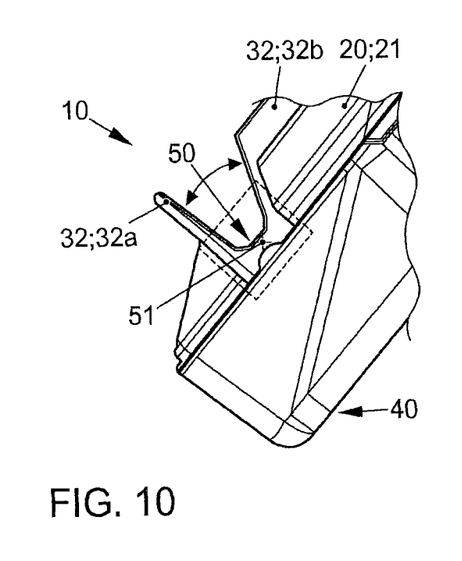

As FIG. 10 shows, the living hinge 50 can be formed between a wall element 32 and the tray surface 31 of the covering element 30. The living hinge 50 has a folding/pivoting axis 51 for folding the covering element 30 open or closed. Depending on the arrangement of the tray 10, in the center console 3 as shown in FIG. 2 or between the instrument panel 9 and the center console 3 as shown in FIG. 8, the wall element 32 can be the rear wall element 32a or the side wall element 32b. Preferably, the wall element 32, in the vicinity of which the living hinge 50 is formed, faces away from the vehicle interior and/or the driver.

Figure 11:
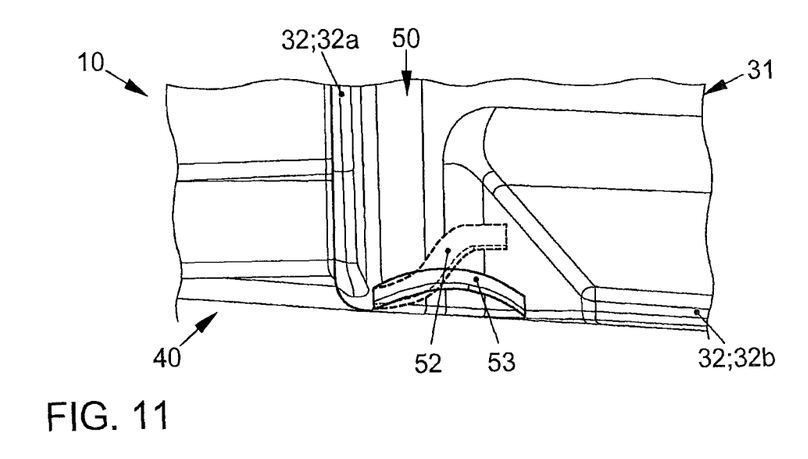
Figure 12:
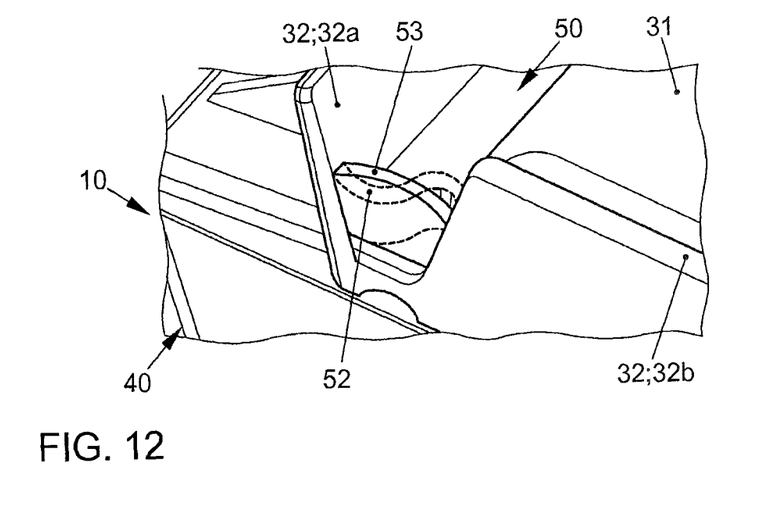

As FIGS. 11 and 12 additionally show, the living hinge 50 can have at least one return element 52, 53 to assist the covering element 30 during transfer from the folded-open state to the folded-closed state. Preferably a return element 52, 53 can be provided to the left and right on each end of the corresponding wall element 32. After compression, the return element 52 causes a springback of the covering element 30 from the folded-open state into the folded-closed state.

It is possible within the scope of the invention that the at least one return element 52, 53 can designed to be resilient and/or elastic. The at least one return element 52, 53 can be made, for example, of the same soft component as the covering element 30 or of a different material.

In FIGS. 11 and 12, two variants of the return element 52, 53 are shown, namely in the form of an S-shaped strip 52 and of a C-shaped strip 53. A springback after compression of the return element 52, 53 can be achieved through such forms of the return element 52, 53. When the covering element 30 is folded open, the return element 52, 53 is compacted in the loops of the S-shaped strip 52 or in the curve of the C-shaped strip 53. When the covering element 30 is released, the return element 52, 53 relaxes and the covering element 30 springs back into the intended folded-closed state. Additional embodiments of the return element 52, 53 are likewise possible within the scope of the invention, for example in the form of damping elements or in the form of cams for cushioning an opening motion of the covering element 30 against a corresponding wall element 32.

As is furthermore evident from FIGS. 11 and 12, the at least one return element 52, 53 can be formed between a rear wall element 32a and a side wall element 32b of the covering element 30. The living hinge 50 extends in this region. The covering element 30 has a taper at the living hinge 50. In this region, a relatively short travel distance of the return element 52, 53 can be realized in order to be able to transfer the covering element 30 into the intended, folded-closed state in a relatively stable manner.

Figure 13:
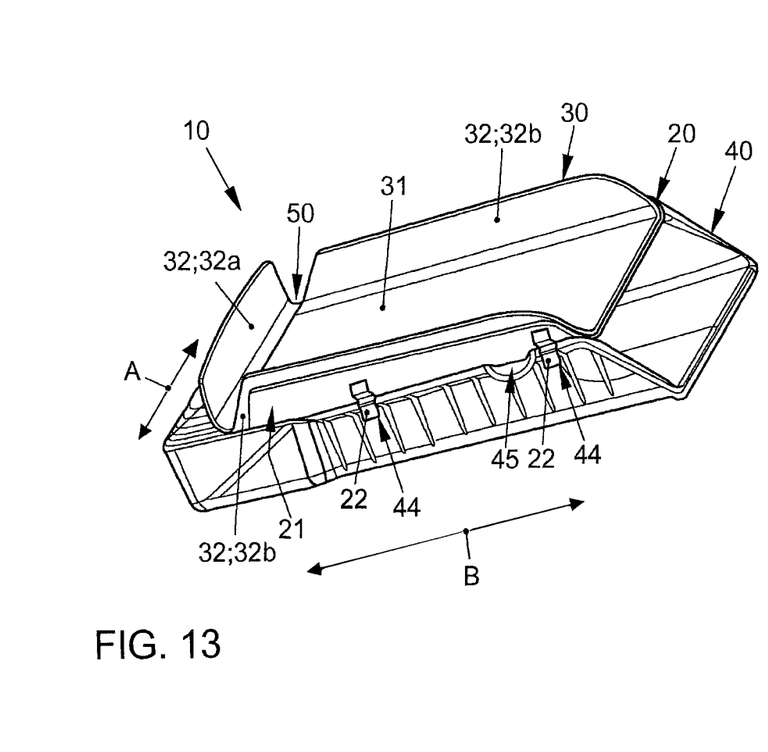

It is evident in FIG. 13 that the tray element 40 can have a formation in the form of an opening aid 45 in order to facilitate opening of the covering element 30.

Figure 14:
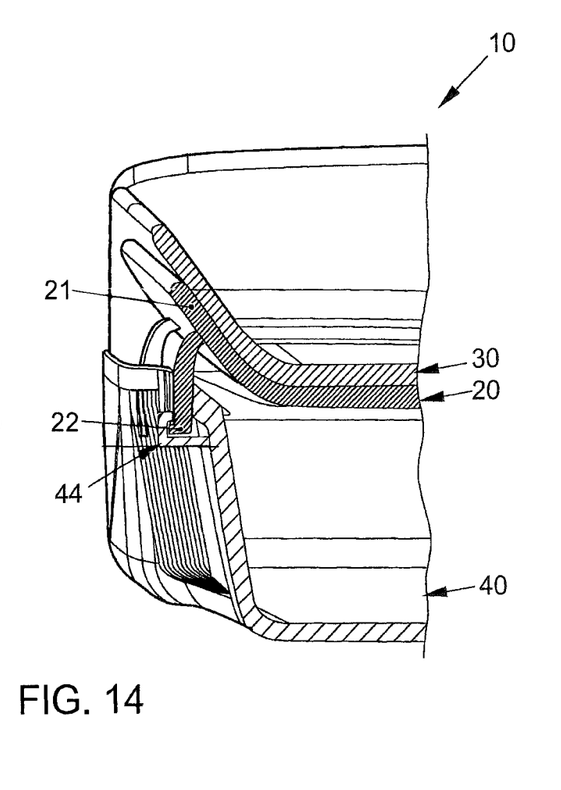

In addition, FIGS. 13 and 14 show that the cover element 20 has at least one latching element 22 (two latching elements 22 are shown by way of example) on a lateral face 21. The latching element 22 can be brought into a releasable interlocking and/or frictional connection with at least one mating latching element 44 of the tray element 40 in order to secure the covering element 30 in a folded-closed state.

The above explanation of the embodiments describes the present invention solely within the framework of examples. Individual features of the embodiments can of course be combined freely with one another, insofar as is technically appropriate, without departing from the scope of the present invention.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A tray for a vehicle for receiving at least one mobile device, having:
    a tray element, which forms a receiving space for receiving the at least one mobile device,
    a cover element, which at least partially covers the receiving space,
    a covering element, which is formed on the cover element and at least partially encloses the cover element so that the covering element forms a tray surface,
    wherein the covering element is connected to the tray element in a foldable manner, and at least partially covers the receiving space,
    wherein the cover element is designed to stabilize at least the covering element, and
    wherein the cover element is formed of a material having a greater hardness than a material of each of the tray element and the covering element.

2. The tray according to claim 1, wherein the tray is implemented as a two-component injection molded part, such that the tray is formed as a single, monolithic piece.

3. The tray according to claim 1, wherein a living hinge is provided that connects the covering element to the tray element in the foldable manner.

4. The tray according to claim 3, wherein the living hinge is formed between a wall element and the tray surface of the covering element.

5. The tray according to claim 3, wherein the living hinge has at least one return element in order to assist the covering element during transfer from a folded-open state to a folded-closed state.

6. The tray according to claim 5, wherein the at least one return element is designed to be resilient and/or elastic.

7. The tray according to claim 5, wherein the at least one return element is designed in the form of an S-shaped strip or a C-shaped strip.

8. The tray according to claim 5, wherein the at least one return element is formed between a rear wall element and a side wall element of the covering element.

9. The tray according to claim 1, wherein the covering element has at least one wall element that projects at an edge of the tray surface and delimits the tray surface so that the covering element forms a dish for receiving objects, wherein the entire tray surface overlaps the cover element.

10. The tray according to claim 1, wherein the covering element completely encloses, the cover element except for at least one lateral face of the cover element, wherein the lateral face extends in a plane parallel to an external surface of a wall element of the covering element and/or orthogonally to the tray surface.

11. The tray according to claim 10, wherein at least one latching element is provided on the at least one lateral face of the cover element that can be brought into a releasable interlocking and/or frictional connection with at least one mating latching element of the tray element in order to secure the covering element in a folded-closed state.

12. The tray according to claim 1, wherein the tray is designed as a cell phone tray, and the cover element is designed to completely or partially cover a display of the at least one mobile device, the at least one mobile device being a cell phone.

13. The tray according to claim 1, wherein the tray is designed to be inserted in a receptacle of a center console of the vehicle, or in that the tray is designed to be inserted in a receptacle between an instrument panel and the center console of the vehicle.

14. The tray according to claim 1, wherein a floor of the tray element is designed to pass an electromagnetic signal of an adjacent coupling antenna of the vehicle on to the device.

15. A method for manufacturing a tray for a vehicle for receiving at least one mobile device, wherein the following steps are carried out:
- manufacturing a tray element that forms a receiving space for receiving the at least one mobile device,
- manufacturing a cover element which at least partially covers the receiving space,
- surrounding the cover element with a covering element, the covering element forming a tray surface,
- connecting the covering element, which encloses the cover element, to the tray element in a foldable manner such that the covering element at least partially covers the receiving space,
- wherein the cover element is formed of a material having a greater hardness than a material of each of the tray element and the covering element, such that the cover element stabilizes at least the covering element.

16. The method according to claim 15, wherein at least one of the manufacturing of the tray element, the manufacturing of the cover element, the surrounding of the cover element with the covering element or the connecting of the covering element to the tray element is carried out in a two-component injection molding process.

17. The tray according to claim 1, wherein the covering element has wall elements that each project from a respective edge of the tray surface and delimit the tray surface so that the covering element forms a dish for receiving objects.

18. The tray according to claim 1, wherein the receiving space of the tray element is at least partially accessible to insert the at least one mobile device into the receiving space and to remove the at least one mobile device out of the receiving space when the covering element is in a folded-open state and when the covering element is in a folded-closed state.

\* \* \* \* \*